3,711,433
COATING COMPOSITION OF AN ACRYLIC OXAZOLINE CONTAINING POLYMER AND CELLULOSE ACETATE BUTYRATE
Monroe M. Willey, Flushing, Mich., assignor to E. I. du Pont de Nemours and Company, Wilmington, Del.
No Drawing. Continuation of abandoned application Ser. No. 754,958, Aug. 23, 1968. This application Feb. 19, 1971, Ser. No. 117,108
Int. Cl. C08f 31/00, 45/26; C09d 3/80
U.S. Cl. 260—17 R
6 Claims

ABSTRACT OF THE DISCLOSURE

A coating composition in which the film-forming material consists essentially of (a) an acrylic oxazoline containing polymer which concontains methacrylate, an alkyl ester of acrylic or methacrylic acid that has 2–12 carbon atoms in the alkyl group, acrylonitrile, and oxazoline containing compound,
(b) cellulose acetate butyrate, and
(c) an organic plasticizer.

This application is a continuation of Ser. No. 754,958, filed Aug. 23, 1968, now abandoned.

BACKGROUND OF THE INVENTION

This invention relates to polymeric coating compositions which can be applied to a variety of substrates, and in particular, to a coating pigmented composition that is useful in refinishing lacquer coatings.

A great need exists for a coating composition that can be used to repair damaged lacquer coatings, in particular, acrylic lacquer coatings which are widely used in the auto industry. A coating composition of this type would find wide use in the repair of damaged autos and trucks and in the production of autos and trucks where portions of the vehicle often require touch-up painting after assembly. Methacrylate coating compositions are well known in the art as shown by Crissey and Lowell Pats. 2,934,509 and 2,934,510, both issued on Apr. 26, 1960. Coating compositions formed from cellulose acetate butyrate and a methacrylate polymer have been successfully used on metal substrates as shown in Evans U.S. 2,849,409, issued Aug. 26, 1958. Polymers containing oxazoline drying oils have been used as coatings and are disclosed in Miranda et al. U.S. 3,208,981, issued Sept. 28, 1965, and Purcell U.S. 3,248,397, issued Apr. 26, 1966. The coating compositions of these prior art patents are excellent for many uses but do not have the properties preferred for a repair composition.

The novel coating composition of this invention has the necessary balance of properties which allows pigmentation with a wide variety of pigments and which has excellent adherence to a lacquer coating, particularly an acrylic lacquer coating, without sanding or buffing the coating before application. Also, the novel coating composition of this invention is resistant to weathering, resistant to solvents, such as gasoline, resistant to water spotting which makes the composition well suited for use as an exterior finish or refinish for automobiles and trucks.

SUMMARY OF THE INVENTION

The novel coating composition of this invention contains 5–45% by weight of a film-forming material which consists essentially of (a) 40–60% by weight, based on the weight of the film-forming material, of an acrylic oxazoline containing polymer which consists essentially of
  (1) 30 to 70% by weight based on the weight of the polymer of methyl methacrylate,
  (2) less than about 35% by weight of an ester of an $\alpha,\beta$-unsaturated mono-carboxylic acid and $C_2$ to $C_{12}$ saturated aliphatic monohydric alcohol,
  (3) less than about 10% by weight acrylonitrile, and
  (4) 15 to 35% by weight of an oxazoline compound having the following structural formula:

FORMULA 1

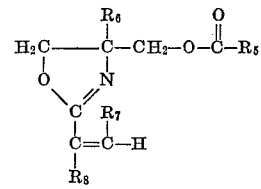

in which $R_5$ is a $C_3$ to $C_{21}$ hydrocarbon group of a saturated or unsaturated fatty acid, $R_6$ is H, $C_1$ or $C_4$ alkyl group or

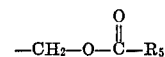

$R_7$ is H, or a $C_1$ to $C_4$ alkyl group and $R_8$ is a $C_2$ to $C_{20}$ hydrocarbon group of a saturated or unsaturated fatty acid,
(b) 60–40% by weight, based on the weight of the film-forming material, of cellulose acetate butyrate that has a viscosity of 0.5–20 seconds at 25° C. measured according to ASTM D–1343–56 and a butyral content of 30–55% by weight; and
(c) 0–10% by weight of an organic plasticizer which is either a polymeric plasticizer, a volatile monomeric plasticizer or a mixture of a polymeric plasticizer and a volatile monomeric plasticizer;

wherein the film-forming materials are in a solution of a volatile organic liquid which includes at least one solvent for the film-forming materials.

DESCRIPTION OF THE INVENTION

About 40–60% by weight, and preferably 40–50% by weight, based on the weight of the film-forming material of an acrylic oxazoline containing polymer is used to form the novel coating composition of this invention.

The acrylic oxazoline containing polymer used in the novel coating composition of this invention is prepared by conventional solution polymerization methods. The monomers are mixed with suitable solvents, such as ethyl acetate, isopropyl alcohol, toluene, butyl alcohol and the like. A polymerization catalyst is then added to the mixture, such as tertiary butyl peroxide, cumene hyperoxide, benzoyl peroxide and azobisisobutyronitrile. The amount of catalyst used is about 0.1 to 2% by weight of the monomers present. The reaction mixture is then refluxed until the polymerization is completed which can be checked by a polymer solids determination.

About 30 to 70% by weight, based on the weight of the polymer, of methyl methacrylate is used to prepare the acrylic oxazoline polymer. Preferably, 53 to 57% by weight of methyl methacrylate is used to form a high quality polymer. Less than about 35% by weight, based on the weight of the polymer, of an ester of an $\alpha,\beta$-unsaturated carboxylic acid and a $C_2$ to $C_{12}$ saturated monohydric alcohol is used to prepare the acrylic oxazoline polymer. Preferred are esters of acrylic and methacrylic acid, such as ethyl acrylate, propyl acrylate, butyl acrylate, 2-ethylhexyl acrylate, lauryl acrylate, ethyl methacrylate, propyl methacrylate, butyl methacrylate, octyl methacrylate, lauryl methacrylate and the like. Lower alkyl acrylate and methacrylate esters in which the alkyl group has 2–6 carbon atoms are particularly preferred for forming a polymer with excellent physical properties. Ethyl acrylate is one particularly preferred ester used in an amount of about 13 to 17% by weight based on the weight of the polymer.

Up to 15% by weight of styrene can be substituted for part or all of the ester of the polymer without adversely affecting the properties of the coating composition.

Less than 10% by weight, based on the weight of the polymer, of acrylonitrile is used to form the acrylic oxazoline polymer used to form the novel coating composition of this invention. Preferably, 3–7% by weight of acrylonitrile is used to form a high quality polymer.

About 15 to 35% by weight, based on the weight of the polymer, and preferably about 23–27% by weight of an oxazoline compound, previously defined by the structural Formula 1 is used to prepare the acrylic oxazoline polymer used in the novel coating composition of this invention. Preferably, the oxazoline compound is a reaction product of 1 mole of tris-(hydroxymethyl)-aminoethane and 3 moles of tall oil fatty acid which is subsequently reacted with formaldehyde. This oxazoline drying oil is described in Purcell U.S. Pat. 3,248,397, issued Apr. 26, 1966, which is hereby incorporated by reference. The compound is currently sold under the trademark of "Chemacoil TA 100." In relating the structural Formula 1 to the above reaction product, $R_5$ is the hydrocarbon group of tall oil fatty acid, $R_8$ is the hydrocarbon group of a tall oil fatty acid less the —$CH_2$— group which is adjacent to the carboxyl group of the acid, $R_6$ is

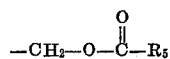

and $R_7$ is H.

About 40–60% by weight, and preferably about 48–55% by weight, based on the weight of the film-forming material of the coating composition, of cellulose acetate butyrate is used to form the novel coating composition of this invention. Preferably, the cellulose acetate butyrate used in this invention has a viscosity of about 0.5–20.0 seconds and more preferably, a viscosity of 1–4 seconds measured at 25° C. and determined according to the method of ASTM D–1343–56. The butyral content of the cellulose acetate butyrate is about 30–50% by weight. To form a particularly high quality coating composition, the cellulose acetate butyrate has 35–45% by weight butyral content.

An organic plasticizer in amounts up to 10% by weight, based on the weight of film-forming material, is used in the novel composition of this invention. Preferably, about 3–6% by weight of organic plasticizer is used which provides a coating composition with excellent durability. Polymeric plasticizers which are particularly useful are epoxidized soya bean oil, oil free and oil modified alkyds and polyesters, such as, polyorthophthalate esters, polyalkylene adipate esters or polyarylene adipate esters.

Volatile monomeric plasticizers can also be used, such as benzylbutyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl, butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl) phthalate. One preferred group of plasticizer is the phthalate esters with butylcyclohexyl phthalate being particularly preferred since it forms a coating with excellent balance of properties.

Blends of volatile polymeric plasticizers and non-volatile plasticizers can be used. Preferably, a weight ratio of about 1:1 of volatile to non-volatile plasticizer can be used.

Preferably, the novel coating composition of this invention has a solids content of film-forming ingredients of about 5–45% by weight, and more preferably, about 20–40% by weight. Examples of the volatile solvents and diluents which are used in formulating the coating composition of this invention are: toluene, xylene, butyl acetate, acetone, methylisobutyl ketone, methylethyl ketone, butyl alcohol, and other aliphatic, cycloaliphatic and aromatic hydrocarbons, esters, ethers, ketones, and alcohols, such as are conventionally used in coating compositions.

Pigments are used in the novel coating composition of this invention in the amounts of 0.1–20.0% pigment volume concentration, preferably, a pigment volume concentration of about 0.3–6.0% is used. Examples of the great variety of pigments which are used in the novel coating composition of this invention are metallic oxides, preferably titanium dioxide, zinc oxide, and the like, metal hydroxides, metal flakes, chromates, such as lead silica, talc, china clay, organic dyes and lead, iron blues, organic reds, maroons, and the like, organic dyes and lakes, etc.

The novel coating compositions of this invention can be applied to a variety of substrates, for example, wood, glass and metal, by any of the usual application methods, such as spraying, dipping, flowcoating and brushing. These coatings can be air dried or can be baked, for example, about 10–50 minutes at 125–175° C. The resulting coatings or films can be rubbed or polished in accordance with conventional techniques, if desired, to improve smoothness or gloss or both.

The novel coating composition of this invention is particularly useful in repairing lacquer coatings and in particular acrylic lacquer coatings. The novel composition of this invention has excellent adhesion and durability when dry and can be pigmented to blend with refinished area with the adjacent areas of the coating which makes the refinished area unnoticeable. Also, the novel coating conduced as in the auto industry.

The dried coatings of the compositions of this invention are characterized by increased freedom from water spotting and have excellent craze resistance in combination with outstanding durability and gloss retention. Coatings of this invention also have good gasoline resistance and improved adhesion as compared with conventional methyl methacrylate lacquers.

The following examples illustrate this invention. The parts and percentages are by weight unless otherwise specified.

EXAMPLE 1

A coating composition is formed by first preparing the following polymer solution:

| | Parts by weight |
|---|---|
| Portion 1: | |
| Methyl amyl acetate | 102.30 |
| Xylol | 152.00 |
| Portion 2: | |
| Methyl methacrylate monomer | 224.80 |
| "Chemacoil" TA–100 (reaction product of one mol of tris-(hydroxymethyl)-amino methane with 3 mols of tall oil fatty acid which is subsequently reacted with one mol of formaldehyde using the process of U.S. Pat. 3,248,397, issued Apr. 26, 1966) | 102.20 |
| Cellosolve acetate | 74.10 |
| Dicumyl peroxide | 4.10 |
| Acrylonitrile | 20.50 |
| Ethyl acrylate monomer | 61.30 |
| Di-tertiary-butyl peroxide | 6.20 |
| Portion 3: | |
| Toluene | 74.10 |
| Total | 821.60 |

The multi-component portions are premixed before they are added. Portion 1 is charged into a conventional polymerization vessel equipped with stirrer, thermometer and means to introduce the reagents, and means of heating and cooling the reaction mixture and is heated with agitation to its reflux temperature which was about 132° C. to 135° C. Portion 2 is premixed only a short time before it is added since it is not stable and is added at an even and continuous rate over a 5-hour period with constant agitation while maintaining a reflux temperature of about 132 to 133° C. The mixture is held at its reflux temperature until a conversion of about 53.5% polymer solids is reached and a constant viscosity is obtained between $Z_2$–$Z_4$ Gardner-Holt viscosity The mixture is then cooled to room temperature and Portion 3 is added. The resulting mixture which has a solids content of about 50% is filtered to remove coagulum that has formed during the reaction. The polymer contains 55% by weight methyl methacrylate, 15% by weight ethyl acrylate, 5% by weight acrylonitrile and 25% by weight of the oxazoline drying oil constituent.

A coating composition is then formulated by forming a pigment dispersion, mixing this dispersion with the above polymer solution and cellulose acetate butyrate solution and diluting this mixture to a spray viscosity with solvents.

FORMULA Y PIGMENT DISPERSION

| | Parts by weight |
|---|---|
| Polymer solution prepared above (50% solids) | 188 |
| Titanium dioxide pigment | 580 |
| Acetone | 77 |
| Toluene | 129 |
| Cellosolve acetate | 26 |
| Total | 1000 |

The ingredients were premixed and charged into a conventional sand-grinding mill and ground to about a 0.3-mill fineness.

The coating composition is formed by mixing the following ingredients:

| | Parts by weight |
|---|---|
| Above prepared polymer solution (50% solids) | 19.6 |
| Formula Y pigment dispersion | 25.2 |
| Cellulose acetate butyrate solution (25% solids, in acetone and toluene, 2 sec. viscosity measured at 25% polymer solids at 25° C. according to ASTM D-1343-56) | 53.7 |
| Butylcyclohexyl phthalate | 1.5 |
| Total | 100.0 |

The coating composition is reduced to a spray viscosity with acetone and toluene and a coating about 2 mils thick is sprayed onto each of the following sets of panels (15 panels per set): autobody steel panels which had been suitably primed; steel panels coated with acrylic lacquer and steel panels coated with a pigmented nitrocellulose lacquer.

The initial appearance of each of these sets of panels and adhesion of the lacquer to the various substrates was excellent.

Five panels of each of the above sets were subjected to a high-humidity-low temperature crack test which consisted of 24 cycles. In each cycle, the panels were subjected to (1) 100% relative humidity and 100° F. for 24 hours, (2) –10° F. for 24 hours and (3) room temperature for 4 hours. At the completion of each cycle, the panels were examined with a magnifying glass for cracks. At the end of the test, many of the above panels showed no cracking, while several had some slight insignificant cracks.

Ten panels of each of the sets were exposed in Florida at a 45° angle facing south. The panel were examined after 6 months and 12 months. After 12 months of weathering, each of the panels showed good color retention, excellent gloss, very little chalking and water spotting, and no loss of adhesion to the substrate.

Both the high humidity-cold crack test and the outdoor exposure test indicate that the novel acrylic lacquer composition of this invention is an excellent primary coating for metals and adheres well to an acrylic lacquer coating and a nitrocellulose lacquer coating even under severe testing conditions.

What is claimed is.

1. A coating composition comprising a volatile organic solvent and 5–45% by weight of a film-forming material consisting of
    (a) 40–60% by weight, based on the weight of the film-forming material, of an acrylic oxazoline containing polymer which consists essentially of
        (1) 30 to 70% by weight based on the weight of said polymer of methyl methacrylate,
        (2) less than about 35% by weight of an ester of an $\alpha,\beta$-unsaturated mono-carboxylic acid and a 2 to 12 carbon atom saturated aliphatic monohydric alcohol,
        (3) less than about 10% by weight of acrylonitrile, and
        (4) 15 to 35% by weight of a compound having the following structural formula

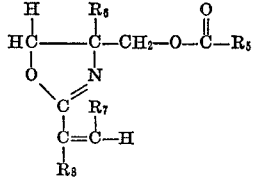

wherein $R_5$ is from the group consisting of a $C_3$ to $C_{21}$ hydrocarbon group of a saturated fatty acid, and, $C_3$ to $C_{21}$ hydrocarbon group of an unsaturated fatty acid, $R_6$ is from the group consisting of H, $C_1$ to $C_4$ alkyl group, and

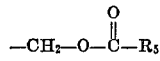

$R_7$ is from the group consisting of H, $C_1$ to $C_4$ alkyl group and $R_8$ is from the group consisting of $C_2$ to $C_{20}$ hydrocarbon group of a saturated fatty acid and $C_2$ to $C_{20}$ hydrocarbon group of an unsaturated fatty acid; and
    (b) 60–40% by weight, based on the weight of the film-forming material, of cellulose acetate butyrate having a viscosity of 0.5–20 seconds at 25° C. measured according to ASTM D–1343–56 and a butyral content of 30–55% by weight; and (c) 0–10% by weight, based on the weight of the film-forming material, of an organic plasticizer selected from the group consisting of epoxidized soya bean oil, polyorthophthalate ester, polyalkylene adipate ester, polyarylene, adipate ester, benzyl butyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, and di(methylcyclohexyl) phthalate.

2. The coating composition of claim 1 containing pigment in a pigment volume concentration of about 0.1 to 20%.

3. The pigmented coating composition of claim 2 in which the $\alpha,\beta$-unsaturated monocarboxylic acid is selected from the group consisting of acrylic acid and methacrylic acid.

4. The pigmented coating composition of claim 2 in which the ester is selected from the group consisting of a lower alkyl methacrylate and a lower alkyl acrylate in which the alkyl group has 2–6 carbon atoms.

5. The coating composition of claim 4 in which $R_5$ is a tall oil fatty acid chain, $R_8$ is a tall oil fatty acid chain less a —$CH_2$— group, $R_7$ is H and $R_6$ is

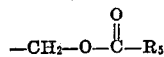

6. The coating composition of claim 1 containing pigment in a pigment volume concentration of 0.1 to 20%, and 20 to 40% by weight based on the weight of the coating composition of a film-forming material in a volatile organic solvent in which said film-forming materials consist of (a) 40–50% by weight, based on the weight of the film-forming material of an acrylic oxazoline containing polymer which consists essentially of (1) 53 to 57% by weight based on the weight of the polymer of methyl methacrylate,
(2) 13 to 17% by weight ethyl acrylate,
(3) 3 to 7% by weight acrylonitrile, and
(4) 23 to 27% by weight of a compound having the structural formula:

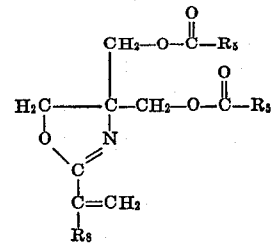

wherein $R_5$ is a hydrocarbon group of a tall oil fatty acid and $R_8$ is a hydrocarbon group of a tall oil fatty acid less a —$CH_2$ group; and (b) 48–55% by weight, based on the weight of the film-forming material, of cellulose acetate butyrate having a viscosity of 1–4 seconds at 25° C. measured according to ASTM D–1343–56 and a butyral content of 35–45% by weight; and (c) 3–6% by weight, based on the weight of the film-forming material, of a plasticizer of butyl cyclohexyl phthalate.

References Cited

UNITED STATES PATENTS

| | | | |
|---|---|---|---|
| 3,366,586 | 1/1968 | Crowley et al. | 260—17 R |
| 3,477,969 | 11/1969 | Parker | 260—17 R |
| 3,488,307 | 1/1970 | Walus et al. | 260—23 AR |

WILLIAM H. SHORT, Primary Examiner

L. M. PHYNES, Assistant Examiner

U.S. Cl. X.R.

117—74, 132 C, 138.8 UA, 143 A; 260—23 AR, 30.6 R, 30.8 R, 31.6, 31.8 AN, 31.8 R, 41 A, 41 B, 41 C, 80.81